United States Patent
Nodomi et al.

(10) Patent No.: US 11,229,864 B2
(45) Date of Patent: Jan. 25, 2022

(54) STRAINER

(71) Applicant: YAMASHIN-FILTER CORP., Kanagawa (JP)

(72) Inventors: Youichi Nodomi, Kanagawa (JP); Takazumi Tange, Kanagawa (JP); Masanori Wakabayashi, Kanagawa (JP)

(73) Assignee: YAMASHIN-FILTER CORP., Kanagawa (JP)

( * ) Notice: Subject to any disclaimer, the term of this patent is extended or adjusted under 35 U.S.C. 154(b) by 0 days.

(21) Appl. No.: 17/031,286

(22) Filed: Sep. 24, 2020

(65) Prior Publication Data

US 2021/0001251 A1    Jan. 7, 2021

Related U.S. Application Data

(63) Continuation of application No. PCT/JP2019/016325, filed on Apr. 16, 2019.

(30) Foreign Application Priority Data

Apr. 25, 2018 (JP) .............................. JP2018-084389

(51) Int. Cl.
*B01D 35/027* (2006.01)
*B01D 29/33* (2006.01)
*F01M 11/00* (2006.01)

(52) U.S. Cl.
CPC ........... *B01D 35/027* (2013.01); *B01D 29/33* (2013.01); *F01M 11/0004* (2013.01); *F01M 2011/007* (2013.01)

(58) Field of Classification Search
CPC ................ B01D 35/0276; B01D 29/23; B01D 2201/02; B01D 35/027; B01D 29/33
See application file for complete search history.

(56) References Cited

U.S. PATENT DOCUMENTS

| 2005/0092553 A1* | 5/2005 | Yagi ......................... G01F 23/58 |
| | | 184/105.1 |
| 2018/0001235 A1 | 1/2018 | Tange et al. |

FOREIGN PATENT DOCUMENTS

| EP | 3278857 A1 | 2/2018 |
| JP | S62-143218 U | 9/1987 |

(Continued)

OTHER PUBLICATIONS

Extended European Search Report issued in European Patent Application No. 19792953.2, dated May 14, 2021 (7 pages).

(Continued)

*Primary Examiner* — Waqaas Ali
(74) *Attorney, Agent, or Firm* — Nakanishi IP Associates, LLC (57) ABSTRACT

A liquid surface height inside a tank is allowed to be confirmed while blow-back of a liquid is reduced. A strainer body having a substantially bottomed tubular shape has a substantially D shape when viewed in a longitudinal direction. A bottom surface of the strainer body has a shape in which a part of a conical shape is cut away, and a top of the substantially conical shape overlaps with a notched portion notched to form the substantially D shape. The bottom surface protrudes toward an opening of the strainer body. A rod is provided adjacent to the notched portion of the strainer body, and a float is provided on a lower end of the rod.

6 Claims, 10 Drawing Sheets

(56) References Cited

FOREIGN PATENT DOCUMENTS

| | | |
|---|---|---|
| JP | H8-155222 A | 6/1996 |
| JP | H11-59789 A | 3/1999 |
| JP | 2004-217141 A | 8/2004 |
| JP | 2005-88761 A | 4/2005 |
| JP | 2005-88762 A | 4/2005 |
| JP | 2005-153574 A | 6/2005 |
| JP | 2007-29804 A | 2/2007 |

OTHER PUBLICATIONS

International Search Report issued in PCT/JP2019/016325 dated Jul. 16, 2019 with English Translation (5 pages).

* cited by examiner

STRAINER

CROSS-REFERENCE TO RELATED APPLICATIONS

This application is a continuation application of International Patent Application No. PCT/JP2019/016325 filed on Apr. 16, 2019, which claims priority to Japanese Patent Application No. 2018-084389 filed on Apr. 25, 2018, the entire contents of which are incorporated by reference.

TECHNICAL FIELD

The present invention relates to a strainer.

BACKGROUND ART

Patent Document 1 discloses a strainer mounted to an oil supply port provided in a tank body constituting a hydraulic oil tank of a construction machine to stop impurities from entering the tank body when an oil is supplied from this oil supply port in the tank body. In this strainer, a guide member is provided outside the strainer body including a net body to be movable up and down over a predetermined range. A float that floats in conjunction with a liquid surface in the tank body is joined to a lower end portion of this rod. Accordingly, an oil supply worker performs an oil supply work while visually observing a rise of the rod, thus ensuring reliably confirming a height position of the liquid surface in the tank body.

CITATION LIST

Patent Document

Patent Document 1: JP 8-155222 A

However, when the strainer described in Patent Document 1 is mounted to the oil supply port, the hydraulic oil contacts and springs back against the strainer during the oil supply. Therefore, the hydraulic oil possibly blows back from the oil supply port of the hydraulic oil tank.

SUMMARY OF INVENTION

One or more embodiments of the present invention is to provide a strainer that allows confirming a liquid surface height inside a tank while reducing blow-back of liquid.

A strainer according to one or more embodiments of the present invention is, for example, provided inside an injection port for injection of a liquid into a tank body. The strainer includes a strainer body, a rod (substantially rodlike or rod shaped member), a guide portion, and a float. The strainer body having a (substantially) bottomed tubular shape includes a side surface and a bottom surface. The side surface includes a net-like body through which the liquid is passable. The net-like body is absent on the bottom surface. The liquid is not passable through the bottom surface. The rod is provided adjacent to the strainer body. The rod is provided substantially along a first direction as a longitudinal direction of the strainer body. The guide portion regulates a moving direction of the rod such that the rod moves along the first direction. The float is disposed on a distal end on the bottom surface side of the rod. The side surface has a substantially D shape when viewed in the first direction. The side surface includes a notched portion and a curved surface portion other than the notched portion. The notched portion is cut away so as to form the substantially D shape. The rod is provided at a position overlapping with a circle as an extension of the curved surface portion and a position adjacent to the notched portion when viewed in the first direction. A position of the float overlaps with a position of the bottom surface when viewed in the first direction. The bottom surface has a shape in which a part of a (substantially) conical shape is cut away and protrudes toward an opening of the strainer body. A top of the conical shape overlaps with the notched portion.

According to one or more embodiments of the strainer according to the present invention, the strainer body having the (substantially) bottomed tubular shape has the substantially D shape when viewed in the longitudinal direction. The bottom surface of the strainer body has the shape in which a part of the conical shape is cut away, and the top of the conical shape overlaps with the notched portion notched to form the substantially D shape. Also, the bottom surface protrudes toward the opening of the strainer body. This makes it possible to reduce blow-back of the liquid. In addition, the rod is provided adjacent to the notched portion of the strainer body, and the float is provided on the lower end of the rod. The float, namely, the rod rises and falls as a liquid surface rises and falls. In this way, a liquid surface height inside a tank can be confirmed. Furthermore, since the entire strainer has the cylindrical shape, there is no restriction on an installation of the strainer to the tank body.

Here, the guide portions may be two rodlike (rod shaped) bodies extending from the bottom surface so as to protrude in the first direction. The float may have a tubular shape. Both sides of the float may be sandwiched between the two rodlike bodies. A position of the float may overlap with a position of the bottom surface when viewed in the first direction. As a result, the rod and the float are less likely to be affected by a flow of oil and the liquid surface can be detected accurately and stably.

Here, the net-like body may be provided on the notched portion in a part above the bottom surface. As a result, even when the liquid surface rises above the bottom surface and the oil flowing into an interior of the strainer does not hit the bottom surface, it is possible to avoid the oil to be pushed back in a direction of the opening of the strainer body as much as possible and to reduce blow-back.

Here, an angle formed by a generatrix of the bottom surface and a horizontal plane may be approximately 60 degrees. Thus, the oil hitting the bottom surface is guided to the net-like body to ensure avoiding the oil hit near the top of the bottom surface to return to the opening of the strainer body.

According to one or more embodiments of the present invention, the liquid surface height inside the tank is allowed to be confirmed while the blow-back of a liquid is reduced.

DESCRIPTION OF EMBODIMENTS

Hereinafter, with reference to the drawings, detailed description will be made on embodiments of the present invention. A strainer of the present invention is provided in an injection pipe for injection of a liquid (here, oil) into a tank.

First Embodiment

Figure 1:
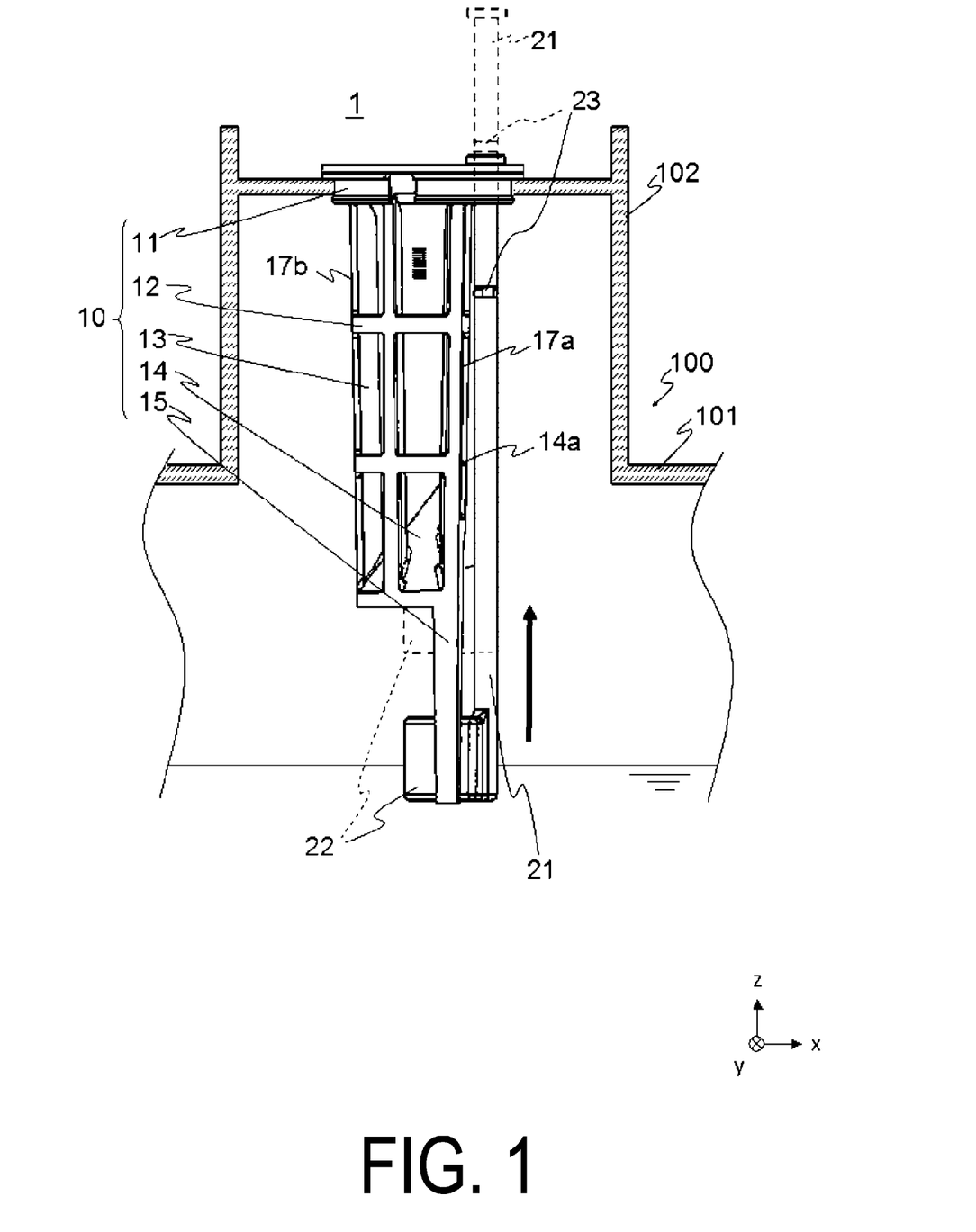
FIG. 1 is a schematic view illustrating a state in which a strainer 1 according to a first embodiment of the present invention is provided in a tank 100.

FIG. 1 is a schematic view illustrating a state in which a strainer 1 according to the first embodiment of the present invention is provided in a tank 100. The tank 100 includes a tank body 101. The tank body 101 is formed from a resin material superior in corrosion resistance, such as polyethylene, or a metal, such as stainless steel. An injection pipe 102 is provided on an upper surface of the tank body 101.

The injection pipe 102 is an injection port for injection of the liquid into the tank body 101. The injection pipe 102 is a tubular member with one end (a base side) communicating with the interior of the tank body 101, and the other end (an upper end side) provided outside the tank body 101. The injection pipe 102 is formed from a resin material superior in corrosion resistance, such as polyethylene, or a metal, such as stainless steel.

The strainer 1 that removes solid components, such as dust and dirt, from the oil supplied from an oil supply gun (not illustrated) is provided to the interior of the injection pipe 102.

Figure 2:
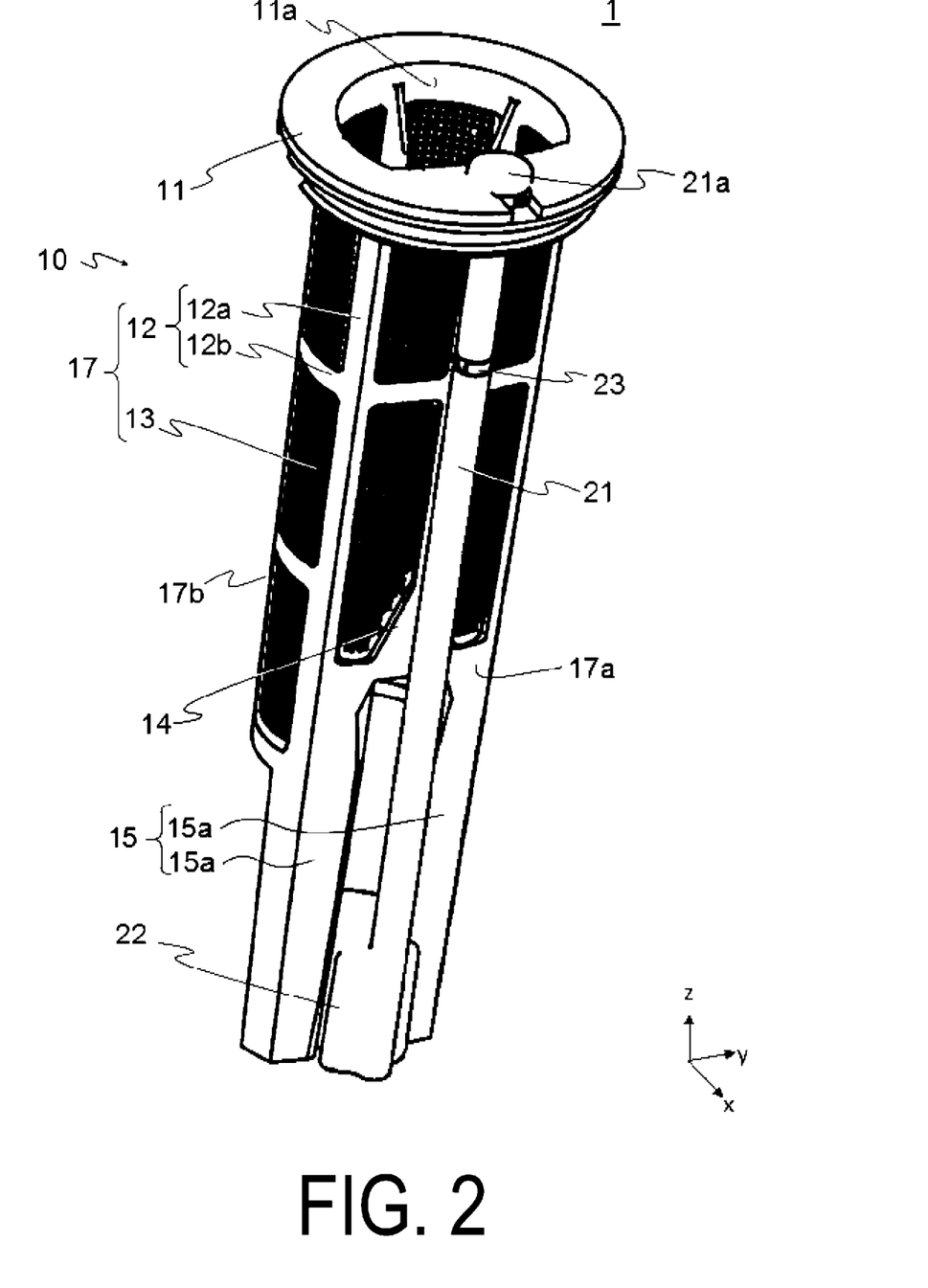
FIG. 2 is a perspective view illustrating an overview of the strainer 1.
Figure 3:
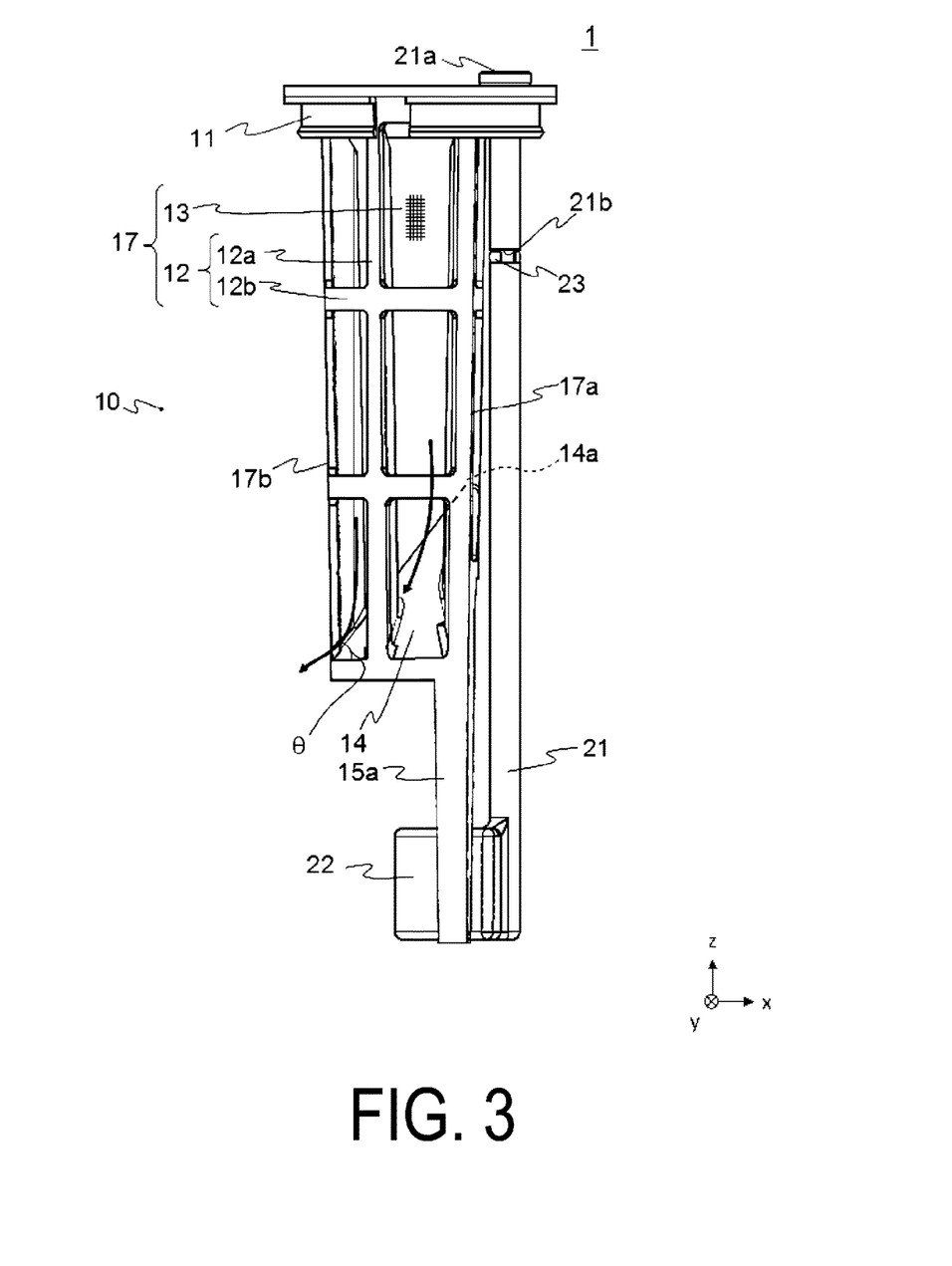
FIG. 3 is a side view illustrating an overview of the strainer 1.
Figure 4:
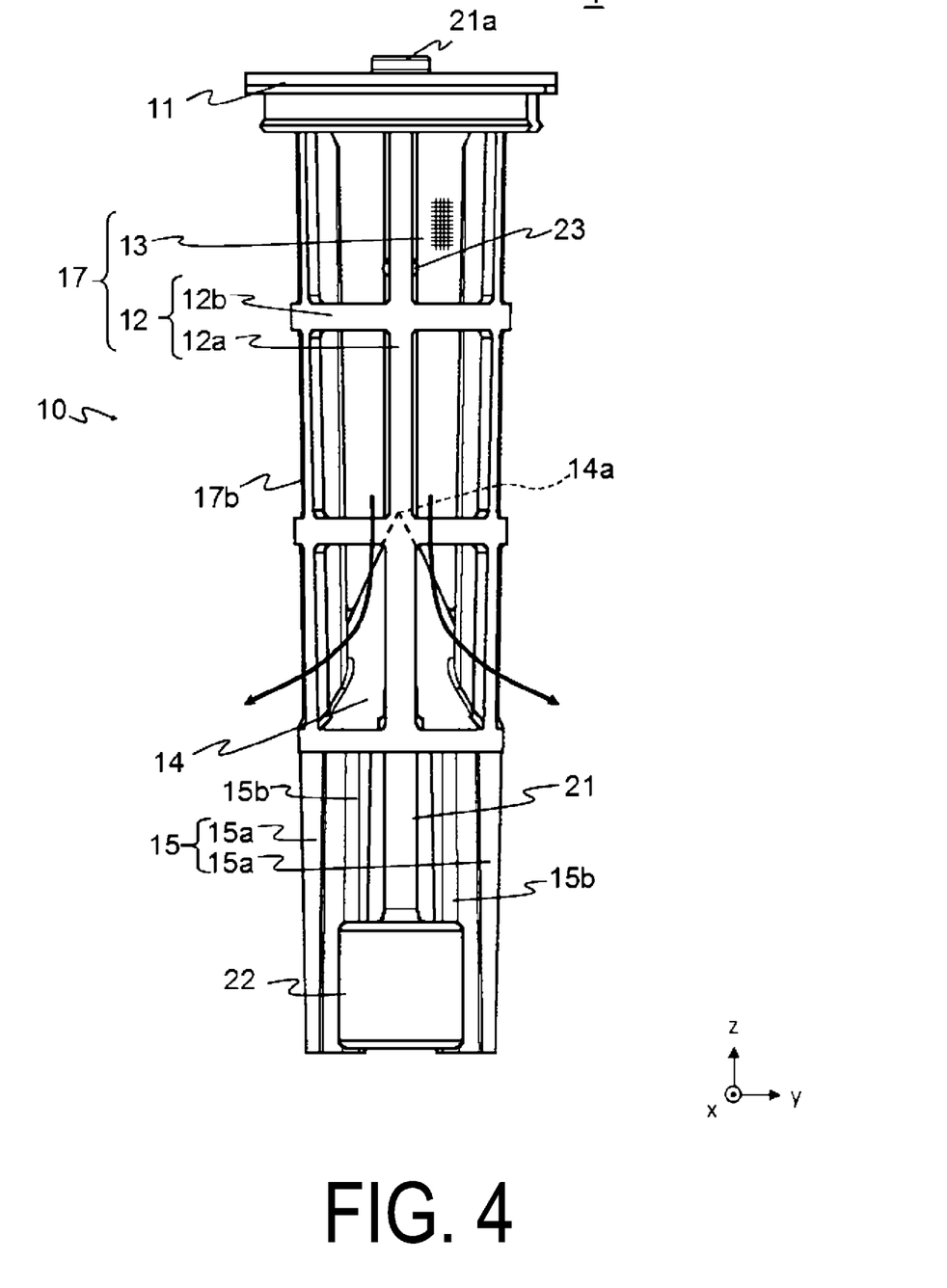
FIG. 4 is a front view illustrating an overview of the strainer 1.
Figure 5:
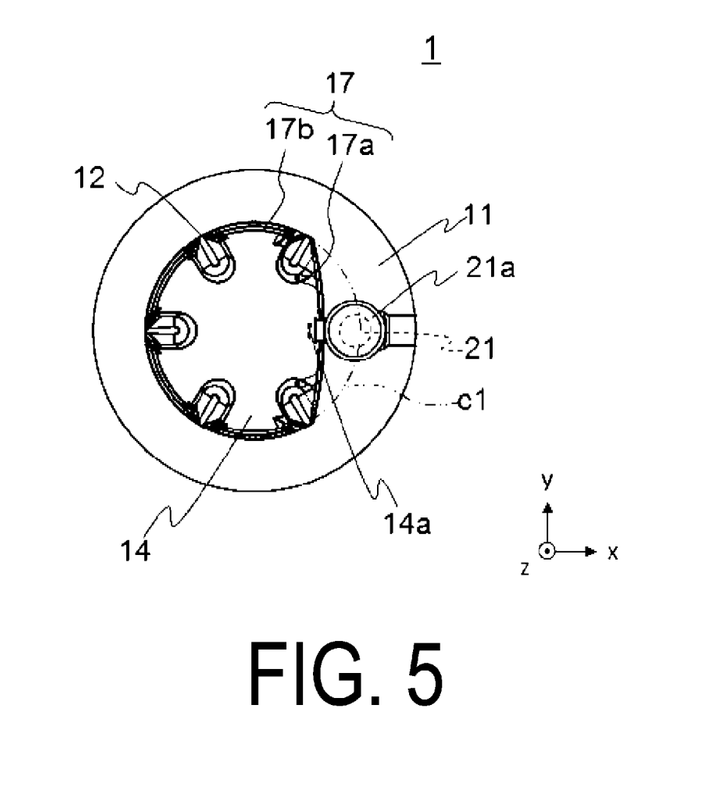
FIG. 5 is a plan view illustrating an overview of the strainer 1.
Figure 6:
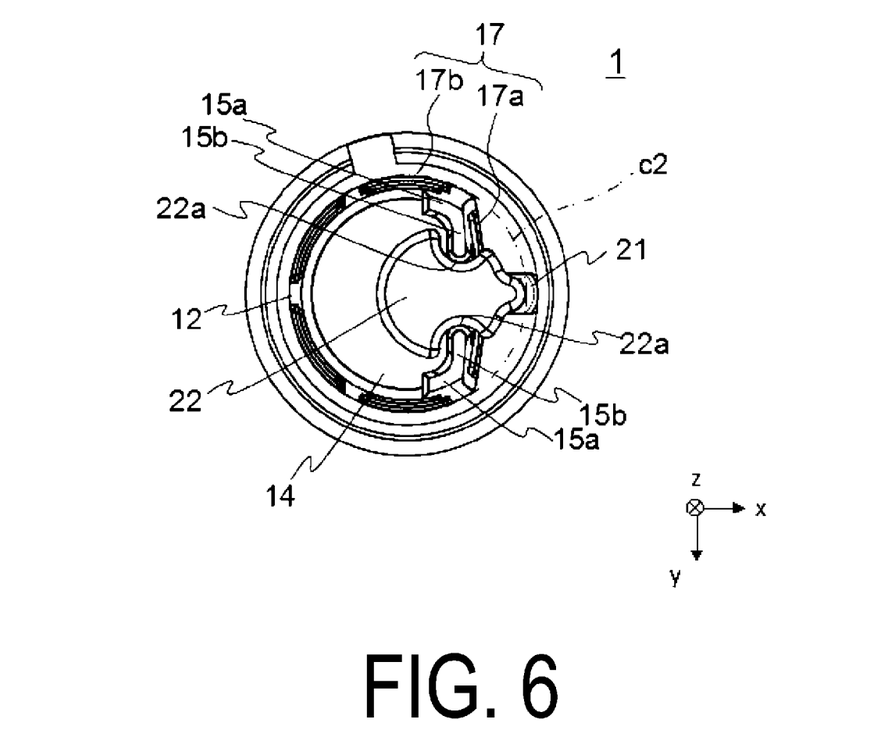
FIG. 6 is a bottom view illustrating an overview of the strainer 1.

Below, detailed description will be given of the strainer 1. FIG. 2 is a perspective view illustrating an overview of the strainer 1. FIG. 3 is a side view illustrating an overview of the strainer 1. FIG. 4 is a front view illustrating an overview of the strainer 1. FIG. 5 is a plan view illustrating an overview of the strainer 1. FIG. 6 is a bottom view illustrating an overview of the strainer 1.

The strainer 1 mainly includes a strainer body 10 having a bottomed substantially cylindrical shape, a rod 21 provided in the strainer body 10, and a float 22 provided on a distal end of the rod.

The strainer body 10 has a substantially bottomed tubular shape, and mainly includes a mounting portion 11, a frame body 12, a screen portion 13, a bottom surface 14, and a guide portion 15.

The mounting portion 11 is used to provide the strainer body 10 in a hollow portion of the injection pipe 102. The mounting portion 11 has a hole 11a (see FIG. 2) that serves as an opening of the strainer body 10.

The frame body 12 is integrally formed with the mounting portion 11 with a resin or the like. The frame body 12 includes a plurality of ribs 12a extending in a z-direction and a plurality of ribs 12b extending in a circumferential direction.

The screen portion 13 is a fabric or fabric-like member (net or net-like body) obtained by weaving a wire material into a mesh shape, and is provided so as to cover a space defined between the rib 12a and the rib 12b. The screen portion 13 is formed from a resin, such as nylon. The frame body 12 and the screen portion 13 constitute a side surface 17 of the strainer body 10. Because the screen portion 13 is provided, an oil can pass through the side surface 17.

The side surface 17 (the frame body 12 and the screen portion 13) has a substantially D shape (shape when viewed in the z-direction) in plan view (see FIGS. 5 and 6). The side surface 17 has a notched portion 17a notched so as to have the substantially D shape and a curved surface portion 17b other than the notched portion 17a.

As illustrated in FIGS. 3 and 4, the bottom surface 14 is integrally formed with the frame body 12 with a resin or the like. Because the bottom surface 14 is not provided with a net-like body, the oil cannot pass through the bottom surface 14.

The bottom surface 14 has a shape in which a part of a substantially conical shape is cut away and protrudes toward the hole 11a inside the side surface 17, and a top 14a of the substantially conical shape overlaps with the notched portion 17a. As illustrated in FIG. 5, in plan view (as viewed from the +z-direction), the top 14a is provided at substantially the center (substantially the center in the y-direction) of the notched portion 17a. Additionally, as illustrated in FIGS. 3 and 4, in the curved surface portion 17b, the bottom surface 14 substantially matches a lower end of the frame body 12. In other words, the top 14a of the bottom surface 14 has the highest height (position in the z-direction) provided in the notched portion 17a, and the bottom surface 14 gradually lowers to the curved surface portion 17b.

Thus, as illustrated in FIGS. 3 and 4, when the oil flowing into the interior of the strainer 1 hits the bottom surface 14, the oil is guided to the screen portion 13 of the curved surface portion 17b and flows out so as to spread outward from the screen portion 13 (see the thick arrows in FIGS. 3 and 4). Thus, the oil flowing into the interior of the strainer 1 does not return in the direction of the mounting portion 11.

The height of the bottom surface 14 is approximately ⅓ of the height of the strainer body 10 (side surface 17). Furthermore, an angle θ formed by a generatrix of the bottom surface 14 and a horizontal plane (a surface substantially parallel to the x-y plane) is approximately 60 degrees (see FIG. 3). A small angle formed by the generatrix of the bottom surface 14 and the horizontal plane decreases an effect of guiding the oil hitting the bottom surface 14 to the screen portion 13. Furthermore, when the top 14a is close to the mounting portion 11, there is a possibility that the oil that hit the neighborhood of the top 14a returns in the direction of the mounting portion 11. Taking these points into account, in the present embodiment, the height of the bottom surface 14 is configured to be approximately ⅓ of the height of the strainer body 10 and the angle formed by the generatrix of the bottom surface 14 and the horizontal plane is set to be approximately 60 degrees, but the shape of the bottom surface 14 is not limited to this.

The guide portion 15 is a member that regulates a moving direction of the rod 21, and includes two rodlike (rod shaped) bodies 15a extending from the bottom surface 14 so as to protrude in the −z-direction. The guide portion 15 will be described in detail later.

The rod 21 is a substantially rodlike member provided adjacent to the strainer body 10 and provided substantially along the z-direction, which is the longitudinal direction of the strainer body 10. The rod 21 passes through a hole (not illustrated) formed in the mounting portion 11. The rod 21 has an upper end (+z-side) including a retaining portion 21a that avoids the rod 21 to come off from the hole in the mounting portion 11. In other words, the rod 21 is provided so as to be movable in the z-direction in the strainer body 10 (here, the mounting portion 11).

As illustrated in FIG. 5, in plan view (when viewed in the z-direction), the rod 21 is provided at a position overlapping with a circle c1 as an extension of the curved surface portion 17b and a position adjacent to the notched portion 17a. This configures the strainer 1 to have a substantially cylindrical shape as a whole.

A groove 21b (see FIG. 3) is formed in the rod 21. A display portion 23 that indicates a position of a liquid surface is attached to the groove 21b. The display portion 23 is formed of a color different from that of the rod 21 (for example, the rod 21 is black and the display portion 23 is red).

As illustrated in FIGS. 2 to 4, the float 22 is provided on the distal end (lower end) on the −z-side (bottom surface 14 side) of the rod 21. The float 22 has a substantially tubular shape. The float 22 is formed of a material with a specific gravity smaller than that of the oil or the inside of the float 22 is formed to be a cavity so as to float in the oil. In the present embodiment, the rod 21 and the float 22 are integrally formed with a resin by blow molding, but the rod 21 or the float 22 are not limited to this configuration.

As illustrated in FIG. 6, the position of the float 22 overlaps with the bottom surface 14 in plan view. In addition, the float 22 is provided inside a circle c2 as an extension of the curved surface portion 17b. As a result, the entire strainer 1 has the substantially cylindrical shape, and it is possible to avoid the rod 21 and the float 22 to significantly protrude from this substantially cylindrical shape. Furthermore, because the oil does not pass through the bottom surface 14, the oil supplied to the strainer 1 is blocked by the bottom surface 14 and does not directly contact the float 22. Therefore, the flow of oil does not interfere with the float 22, and the float 22 moves up and down following the liquid surface.

A side surface of the float 22 is sandwiched between the two rodlike bodies 15a of the guide portion 15. As illustrated in FIG. 6, the two rodlike bodies 15a each have an opposed projection 15b. Additionally, the float 22 has two recessed portions 22a. As a result of distal ends of the projections 15b coming into contact with the recessed portions 22a, movement of the float 22, that is, the rod 21, in the x-direction and the y-direction are regulated, and the rod 21 and the float 22 can move only in the z-direction.

Next, functions of the strainer 1 configured as described above will be described with reference to FIG. 1. The oil is supplied from the mounting portion 11 side to the strainer body 10. The oil is supplied at a flow rate of approximately 250 liters/minute (L/min).

During the oil supply, as indicated by the solid line in FIG. 1, the oil stored in the tank body 101 decreases. Accordingly, the oil flowing into the interior of the strainer 1 hits the bottom surface 14 and then flows into the interior of the tank body 101 from the screen portion 13 of the curved surface portion 17b.

In the present embodiment, the height of the top 14a provided in the notched portion 17a is the highest, and in the curved surface portion 17b, the bottom surface 14 is formed to have a shape in which a part of the substantially conical shape is cut away (that is, a diameter of the bottom surface having the substantially conical shape is large) so that the bottom surface 14 substantially matches the lower end of the frame body 12. Therefore, even when the flow rate of the oil is large, 250 L/min, the oil is not pushed back in the direction of the mounting portion 11 and flows out from the screen portion 13. In this way, providing the bottom surface 14 allows reducing blow-back of the oil.

When the oil is stored in the tank body 101 by oil supply and the liquid surface height inside the tank body 101 rises, the float 22 comes into contact with the liquid surface. Because the float 22 floats in the oil, the float 22 and the rod 21 rise as the liquid surface rises (see the arrow in FIG. 1).

As the rod 21 starts rising, an oil supply worker can see that a sufficient amount of oil is stored inside the tank body 101. As the oil supply continues, the rod 21 continues rising, and as indicated by the dotted line in FIG. 1, the display portion 23 protrudes upward (+z-direction) from the mounting portion 11. Accordingly, the oil supply worker can see that the oil in the tank body 101 becomes full. In this way, the liquid surface height inside the tank body 101 can be confirmed.

Because the position of the float 22 overlaps with the bottom surface 14 in plan view and the oil does not pass through the bottom surface 14, the oil supplied to the strainer 1 does not directly contact the float 22. Therefore, the flow of oil does not interfere with the float 22, and the float 22 moves up and down following the liquid surface. As a result, the liquid surface can be detected accurately and stably.

Furthermore, since the entire strainer 1 has the substantially cylindrical shape and the rod 21 or the float 22 do not significantly protrude from this substantially cylindrical shape, there is no restriction on the installation of the strainer 1 to the tank body 101. Furthermore, because the rod 21 is adjacent to the notched portion 17a, the rod 21 and the float 22 are less likely to be affected by the flow of oil flowing out from the curved surface portion 17b. As a result, the liquid surface can be detected accurately and stably.

The rod 21 and the float 22 are held to the strainer body 10 near the end portion on the +z-side (the part of the mounting portion 11) and near the end portion on the −z-side (the part of the float 22) of the rod 21. Therefore, even when a slight distortion occurs in the rod 21, a load is not applied while the rod 21 moves up and down, and the rod 21 smoothly moves up and down.

After the float 22 rises to be in the state indicated by the dotted line in FIG. 1 in this way, when the oil supply worker continues performing the oil supply work, the liquid surface rises above the bottom surface 14, the oil flowing into the interior of the strainer 1 does not hit the bottom surface 14, and the oil is likely to be pushed back in the direction of the mounting portion 11. However, the screen portion 13 is also provided on the notched portion 17a in the part above the bottom surface 14 (see FIG. 2), in addition to the curved surface portion 17b, an amount of oil that flows out from the screen portion 13 is larger than that of the part where the bottom surface 14 is provided. Thus, even when the oil flowing into the interior of the strainer 1 does not hit the bottom surface 14, it is possible to avoid the oil to be pushed back in the direction of the mounting portion 11 as much as possible.

In addition, the screen portion 13 is also provided on the notched portion 17a in the part above the bottom surface 14 (see FIG. 2), in addition to the curved surface portion 17b, there is no restriction on the direction of the oil supply gun. For example, in a case where the screen portion 13 is not provided on the entire surface of the notched portion 17a and the oil cannot pass through, supplying the oil with the oil supply gun facing the notched portion 17a possibly springs back the oil at the notched portion 17a. In contrast, in the present embodiment, the screen portion 13 is provided on the notched portion 17a, and thus the oil supply worker can perform the oil supply work without caring the direction of the oil supply gun.

Second Embodiment

In the first embodiment, the position of the float 22 overlaps with the position of the bottom surface 14 in plan view, but the arrangement of the float is not limited to this. Below, description is given of a strainer 2 according to the second embodiment. Note that the same components as those in the first embodiment are denoted by the same reference numerals, and descriptions thereof will be omitted.

Figure 7:
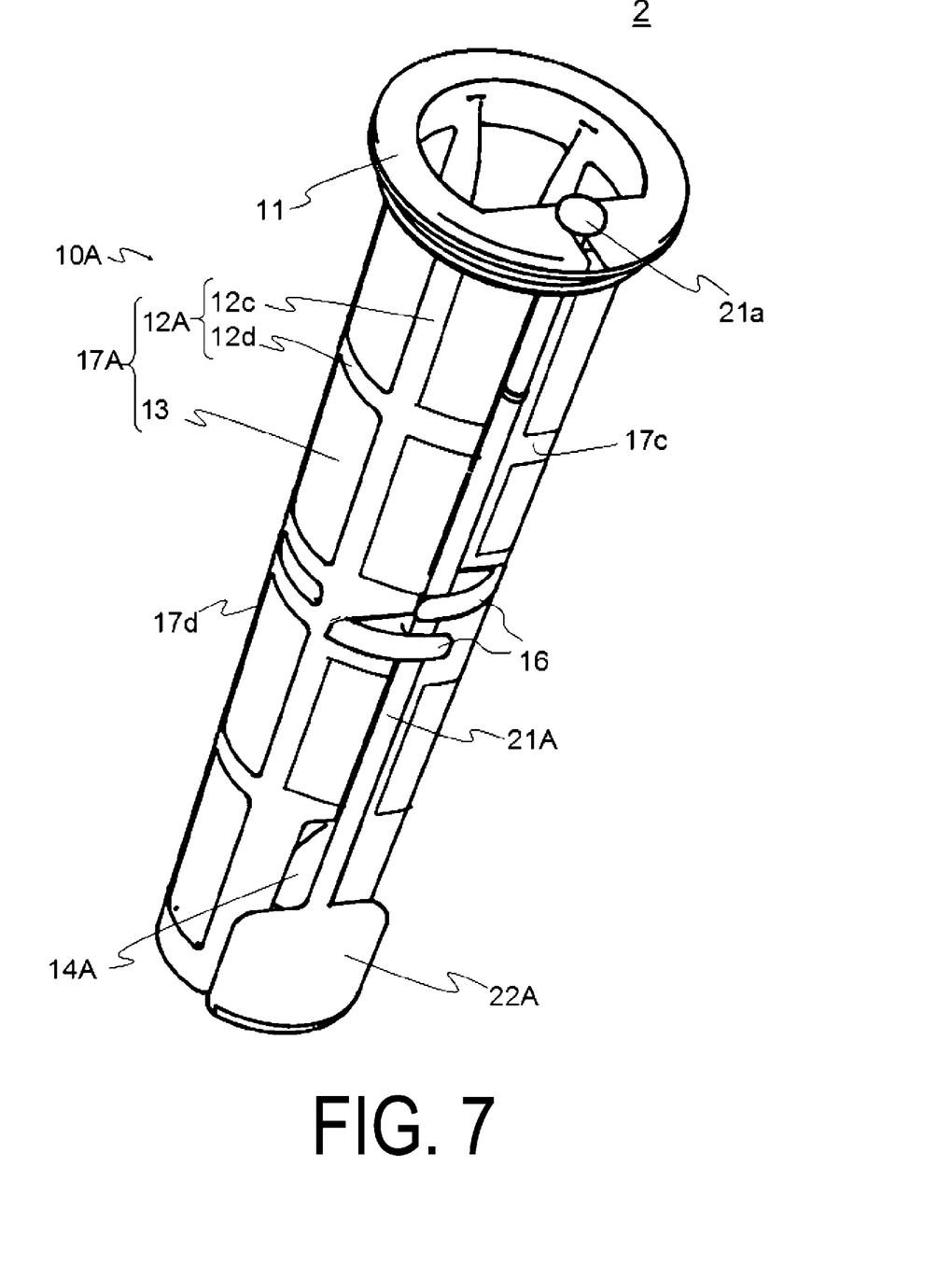
FIG. 7 is a perspective view illustrating an overview of a strainer 2 according to a second embodiment.
Figure 8:
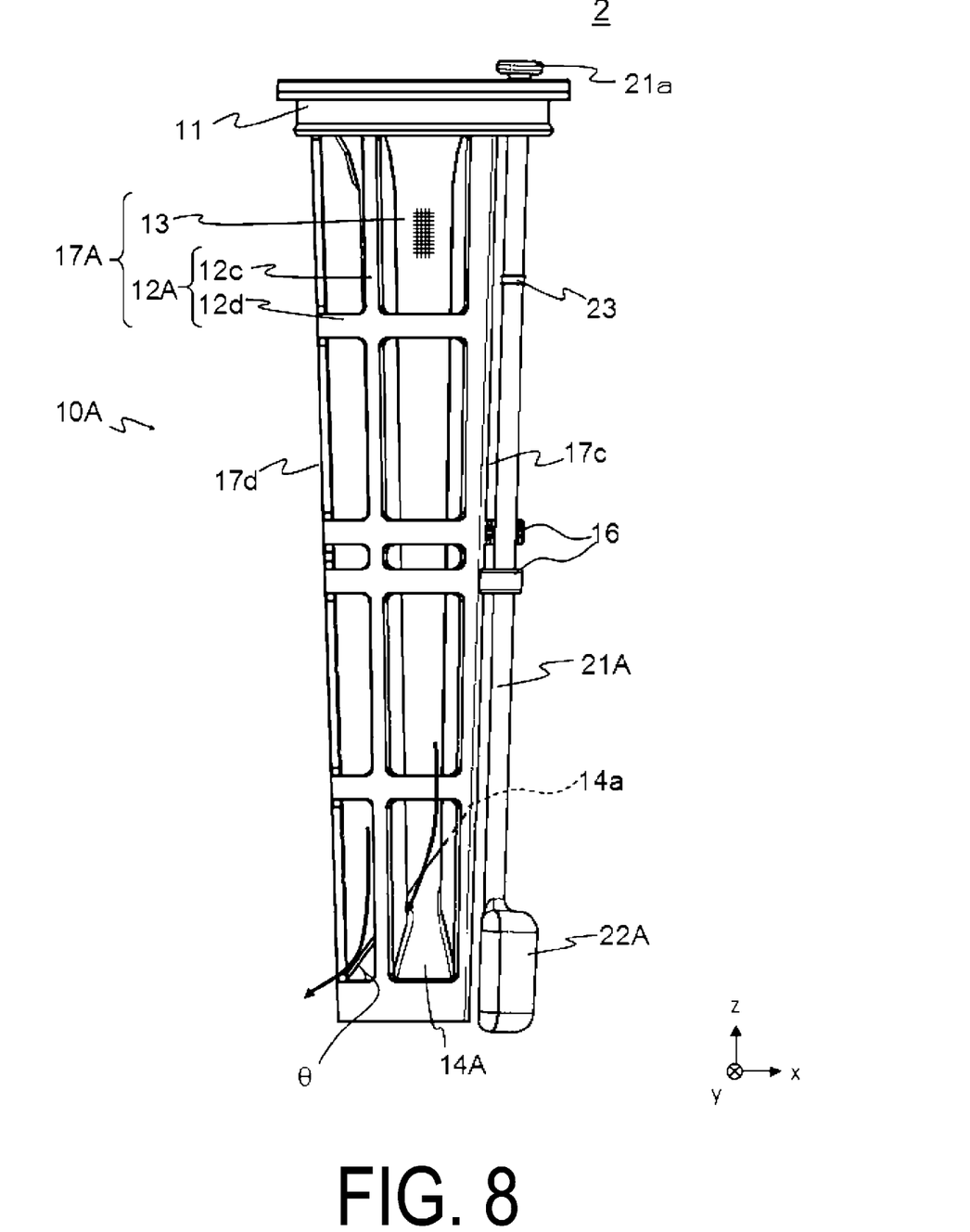
FIG. 8 is a side view illustrating an overview of the strainer 2.
Figure 9:
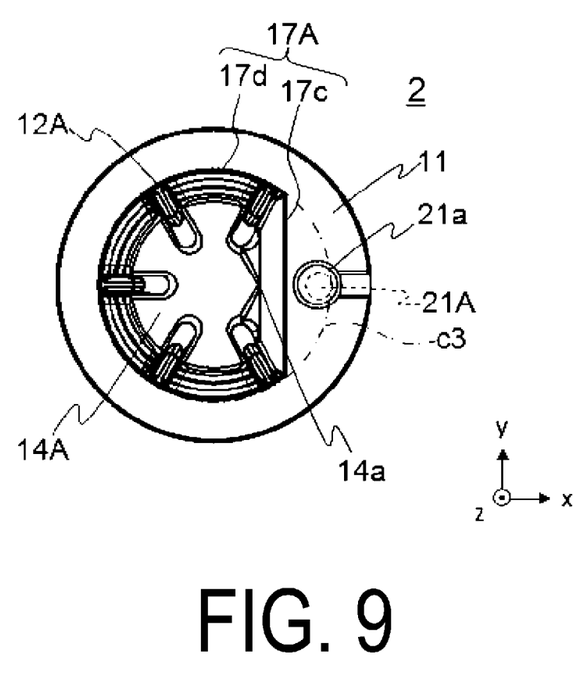
FIG. 9 is a plan view illustrating an overview of the strainer 2.
Figure 10:
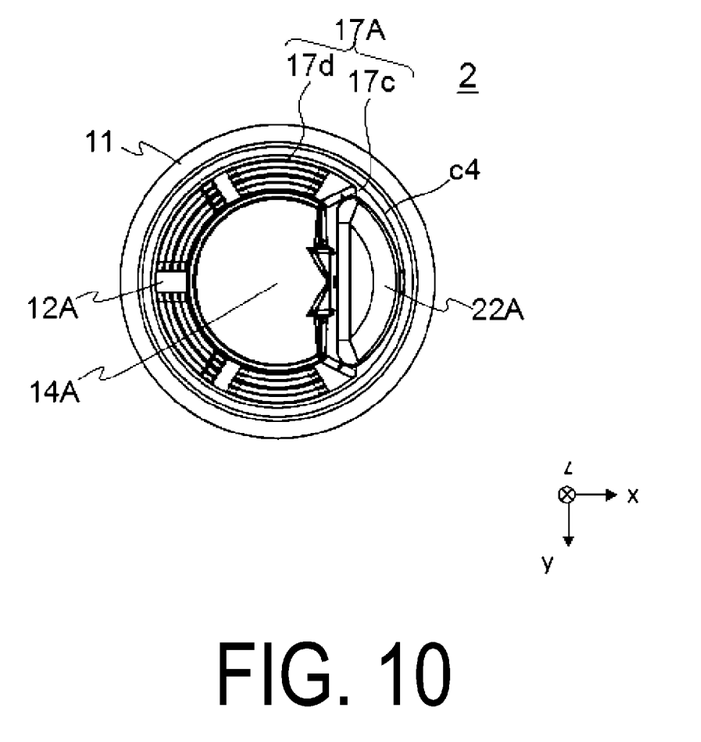
FIG. 10 is a bottom view illustrating an overview of the strainer 2.

FIG. 7 is a perspective view illustrating an overview of the strainer 2 according to the second embodiment. FIG. 8 is a side view illustrating an overview of the strainer 2. FIG. 9 is a plan view illustrating an overview of the strainer 2. FIG. 10 is a bottom view illustrating an overview of the strainer 2.

The strainer 2 mainly includes a strainer body 10A having a bottomed substantially cylindrical shape, a rod 21A provided in the strainer body 10A, and a float 22A provided on a distal end of the rod.

The strainer body 10A has a substantially bottomed tubular shape, and mainly includes the mounting portion 11, a frame body 12A, the screen portion 13, a bottom surface 14A, and guide portions 16.

Similarly to the frame body 12, the frame body 12A is integrally formed with the mounting portion 11 with a resin or the like and includes a plurality of ribs 12c extending in a z-direction and a plurality of ribs 12d extending in a circumferential direction. The screen portion 13 is provided so as to cover a space defined between the rib 12c and the rib 12d.

The frame body 12A and the screen portion 13 constitute a side surface 17A of the strainer body 10A. The side surface 17A (the frame body 12A and the screen portion 13) has a substantially D shape (shape when viewed in the z-direction) in plan view (see FIGS. 9 and 10). The side surface 17A has a notched portion 17c notched so as to have the substantially D shape and a curved surface portion 17d other than the notched portion 17c.

The bottom surface 14A is integrally formed with the frame body 12A with a resin or the like. Since the bottom surface 14A does not include the screen portion 13, the oil cannot pass through. The bottom surface 14A has a shape in which a part of a substantially conical shape is cut away, and the top 14a of the substantially conical shape overlaps with the notched portion 17c. As illustrated in FIG. 9, in plan view, the top 14a is provided at substantially the center (substantially the center in the y-direction) of the notched portion 17c. Additionally, in the curved surface portion 17d, the bottom surface 14A substantially matches a lower end of the frame body 12A. In other words, the top 14a of the bottom surface 14A has the highest height provided in the notched portion 17c, and the bottom surface 14A gradually lowers to the curved surface portion 17d. An angle θ formed by a generatrix of the bottom surface 14A and a horizontal plane is approximately 60 degrees (see FIG. 8).

As illustrated in FIGS. 7 and 8, similarly to the rod 21, the rod 21A is a substantially rodlike member provided adjacent to the strainer body 10A and provided substantially along the z-direction. The rod 21A is provided so as to be movable along the z-direction in the strainer body 10A. The rod 21A passes through a hole (not illustrated) formed in the mounting portion 11, and includes the retaining portion 21a on the upper end (+z-side) of the rod 21A.

The float 22A is provided on a distal end (lower end) on the −z-side of the rod 21. Similarly to the float 22, the float 22A has a substantially tubular shape and is formed so as to float in the oil.

As illustrated in FIG. 9, in plan view, the rod 21A is provided at a position overlapping with a circle c3 as an extension of the curved surface portion 17d and a position adjacent to the notched portion 17c. In addition, as illustrated in FIG. 10, the float 22A is provided inside a circle c4 as an extension of the curved surface portion 17d. As a result, the entire strainer 2 has the substantially cylindrical shape, and it is possible to avoid the rod 21A and the float 22A to significantly protrude from this substantially cylindrical shape.

A moving direction of the rod 21A is regulated by the two guide portions 16 provided to be substantially opposed to one another. As illustrated in FIGS. 7 and 8, the guide portions 16 are provided on the notched portion 17c. The two guide portions 16 provided so as to be substantially opposed to one another avoid the movement of the rod 21A in the x-direction and the y-direction, so that the rod 21A can only move in the z-direction.

Next, functions of the strainer 2 configured as described above will be described with reference to FIG. 8. The oil flowing into the interior of the strainer 2 during the oil supply hits the bottom surface 14A and then flows into the interior of the tank body 101 from the screen portion 13 of the curved surface portion 17d (see the arrow in FIG. 8).

In the present embodiment, the height of the top 14a provided in the notched portion 17c is the highest, and in the curved surface portion 17d, the bottom surface 14A has a shape in which a part of the substantially conical shape is cut away (that is, a diameter of the bottom surface having the substantially conical shape is large) so that the bottom surface 14A substantially matches the lower end of the frame body 12A. Therefore, even when the flow rate of the oil is large, the oil is not pushed back in the direction of the mounting portion 11 and flows out from the screen portion 13. In this way, providing the bottom surface 14A allows reducing blow-back of the oil.

When the oil is stored in the tank body 101 by oil supply and the liquid surface height inside the tank body 101 rises, the float 22 comes into contact with the liquid surface. Because the float 22A floats in the oil, the float 22A and the rod 21A rise as the liquid surface rises. When the rod 21A rises and the display portion 23 protrudes upward (+z-direction) from the mounting portion 11, the oil supply worker can see that the oil in the tank body 101 becomes full. In this way, the liquid surface height inside the tank body 101 can be confirmed.

Since the float 22 is provided on the rear side (+x-side) of the bottom surface 14 in plan view and the oil does not pass through the bottom surface 14, the oil supplied to the strainer 2 does not directly contact the float 22A. Therefore, the flow of oil does not interfere with the float 22A, and the float 22A moves up and down following the liquid surface. Furthermore, since the entire strainer 2 has the substantially cylindrical shape and the rod 21A or the float 22A do not protrude from this substantially cylindrical shape, there is no restriction on the installation of the strainer 2 to the tank body 101. Furthermore, because the rod 21A is adjacent to the notched portion 17c, the rod 21A and the float 22A are less likely to be affected by the flow of oil flowing out from the curved surface portion 17d. As a result, the liquid surface can be detected accurately and stably.

Even after the float 22A rises to the top, when the oil supply worker continues performing the oil supply work, the liquid surface rises above the bottom surface 14A, the oil flowing into the interior of the strainer 2 does not hit the bottom surface 14A, and the oil is likely to be pushed back in the direction of the mounting portion 11. However, the screen portion 13 is also provided on the notched portion 17c in the part above the bottom surface 14A (see FIG. 7), in addition to the curved surface portion 17d, an amount of oil that flows out from the screen portion 13 is larger than that of the part where the bottom surface 14A is provided. Thus, even when the oil flowing into the interior of the strainer 2 does not hit the bottom surface 14A, it is possible to avoid the oil to be pushed back in the direction of the mounting portion 11 as much as possible.

In addition, the screen portion 13 is also provided on the notched portion 17c in the part above the bottom surface 14A (see FIG. 7), in addition to the curved surface portion 17d, there is no restriction on the direction of the oil supply gun. Thus, the oil supply worker can perform the oil supply work without caring the direction of the oil supply gun.

The embodiments of the invention are described above in detail with reference to the drawings. Specific configurations are not limited to the embodiments and also include changes in the design or the like within a scope that does not depart from the gist of the invention. A person skilled in the art can easily modify, add, and convert each element in the above embodiments as appropriate.

In addition, the term "substantially" in the present invention is a concept not only including the case of being strictly the same, but also including deviations and modifications to an extent that the deviations and modifications do not result in a loss of identity. For example, a substantially cylindrical shape is a concept that includes an elliptical shape having a cross section close to a circle, for example, and is not strictly limited to a cylindrical shape (a cross section that is circular). Further, a shape simply expressed as cylindrical, for example, includes "substantially cylindrical," and does not only mean strictly cylindrical. In addition, in the present invention, the term "near" means to include a region in a certain range (the range can be determined as desired) near a reference position. For example, "in the vicinity of A" refers to a region of a range near A, and is a concept indicating that A may or may not be included.

REFERENCE SIGNS LIST 1, 2: Strainer
10, 10A: Strainer body
11: Mounting portion
11a: Hole
12, 12A: Frame body
12a, 12b, 12c, 12d: Rib
13: Screen portion
14, 14A: Bottom surface
14a: Top
15, 16: Guide portion
15a: Rodlike body
15b: Protrusion
17, 17A: Side surface
17a, 17c: Notched portion
17b, 17d: Curved surface portion
21, 21A: Rod
21a: Retaining portion
21b: Groove
22, 22A: Float
22a: Recessed portion
23: Display portion
100: Tank
101: Tank body
102: Injection pipe

The invention claimed is:

1. A strainer provided inside an injection port for injection of a liquid into a tank body, the strainer, comprising:
a strainer body having a bottomed tubular shape that includes a side surface and a bottom surface, the side surface including a net-like body through which the liquid is passable, the net-like body being absent on the bottom surface, the liquid being not passable through the bottom surface;
a rod provided adjacent to the strainer body, the rod being provided along a first direction as a longitudinal direction of the strainer body;
a guide portion that regulates a moving direction of the rod such that the rod moves along the first direction; and
a float disposed on a distal end on the bottom surface side of the rod, wherein
the side surface has a substantially D shape when viewed in the first direction, the side surface includes a notched portion and a curved surface portion other than the notched portion, and the notched portion is cut away so as to form the substantially D shape,
the rod is provided at a position overlapping with a circle as a n extension of the curved surface portion and a position adjacent to the notched portion when viewed in the first direction, and
the bottom surface has a shape in which a part of a conical shape is cut away and protrudes toward an opening of the strainer body, and a top of the conical shape overlaps with the notched portion,
wherein
the guide portions are two rod shaped bodies extending from the bottom surface so as to protrude in the first direction,
the float has a tubular shape,
both sides of the float are sandwiched between the two rod shaped bodies, and
a position of the float overlaps with a position of the bottom surface when viewed in the first direction.
2. The strainer according to claim 1, wherein
the net-like body is provided on the notched portion in a part above the bottom surface.
3. The strainer according to claim 1, wherein
an angle formed by a generatrix of the bottom surface and a horizontal plane is approximately 60 degrees.
4. A strainer provided inside an injection port for injection of a liquid into a tank body, the strainer, comprising:
a strainer body having a bottomed tubular shape that includes a side surface and a bottom surface, the side surface including a net-like body through which the liquid is passable, the net-like body being absent on the bottom surface, the liquid being not passable through the bottom surface;
a rod provided adjacent to the strainer body, the rod being provided along a first direction as a longitudinal direction of the strainer body;
a guide portion that regulates a moving direction of the rod such that the rod moves along the first direction; and
a float disposed on a distal end on the bottom surface side of the rod, wherein
the side surface has a substantially D shape when viewed in the first direction, the side surface includes a notched portion and a curved surface portion other than the notched portion, and the notched portion is cut away so as to form the substantially D shape, the rod is provided at a position overlapping with a circle as an extension of the curved surface portion and a position adjacent to the notched portion when viewed in the first direction, and the bottom surface has a shape in which a part of a conical shape is cut awa y a nd protrudes toward an opening of the strainer body, and a top of the conical shape overlaps with the notched portion, wherein the net-like body is provided on the notched portion in a part above the bottom surface.

5. The strainer according to claim 4, wherein an angle formed by a generatrix of the bottom surface and a horizontal plane is approximately 60 degrees.

6. A strainer provided inside an injection port for injection of a liquid into a tank body, the strainer, comprising:

a strainer body having a bottomed tubular shape that includes a side surface and a bottom surface, the side surface including a net-like body through which the liquid is passable, the net-like body being absent on the bottom surface, the liquid being not passable through the bottom surface;

a rod provided adjacent to the strainer body, the rod being provided along a first direction as a longitudinal direction of the strainer body;

a guide portion that regulates a moving direction of the rod such that the rod moves along the first direction; and a float disposed on a distal end on the bottom surface side of the rod, wherein the side surface has a substantially D shape when viewed in the first direction, the side surface includes a notched portion and a curved surface portion other than the notched portion, and the notched portion is cut away so as to form the substantially D shape, the rod is provided at a position overlapping with a circle as an extension of the curved surface portion and a position adjacent to the notched portion when viewed in the first direction, and the bottom surface has a shape in which a part of a conical shape is cut away and protrudes toward an opening of the strainer body, and a top of the conical shape overlaps with the notched portion, wherein an angle formed by a generatrix of the bottom surface and a horizontal plane is approximately 60 degrees.

* * * * *